(12) United States Patent
Yamaguchi et al.

(10) Patent No.: US 6,272,360 B1
(45) Date of Patent: Aug. 7, 2001

(54) REMOTELY INSTALLED TRANSMITTER AND A HANDS-FREE TWO-WAY VOICE TERMINAL DEVICE USING SAME

(75) Inventors: Noboru Yamaguchi, Yokohama; Masao Konomi, Tokyo, both of (JP)

(73) Assignee: Pan Communications, Inc., Tokyo (JP)

( * ) Notice: Subject to any disclaimer, the term of this patent is extended or adjusted under 35 U.S.C. 154(b) by 0 days.

(21) Appl. No.: 08/888,281

(22) Filed: Jul. 3, 1997

(51) Int. Cl.$^7$ ................................ H04R 1/20; H04B 1/10
(52) U.S. Cl. .................... 455/569; 455/570; 455/297; 381/71.4; 381/94.7
(58) Field of Search ............................... 455/569, 570, 455/297; 381/71.4, 91, 94.7, 302, 361

(56) References Cited

U.S. PATENT DOCUMENTS

| | | | |
|---|---|---|---|
| 1,529,520 | * 3/1925 | Watkins | 381/361 |
| 1,910,672 | * 5/1933 | Bourne | 381/361 |
| 2,255,249 | 9/1941 | Greibach | 179/121 |
| 2,255,250 | 9/1941 | Greibach | 179/121 |
| 3,197,576 | 7/1965 | Martin | 179/107 |
| 3,258,533 | 6/1966 | Bredon | 179/1 |
| 3,385,937 | 5/1968 | Lafon | 179/107 |
| 3,588,382 | 6/1971 | Reedyk | 179/111 E |
| 3,732,446 | 5/1973 | Bryant | 310/9.4 |
| 3,856,995 | * 12/1974 | Cragg et al. | 381/357 |
| 3,863,027 | 1/1975 | Acks | 179/1 D |
| 3,869,584 | 3/1975 | Wilde | 179/156 |
| 3,876,843 | 4/1975 | Moen | 179/107 FD |

(List continued on next page.)

FOREIGN PATENT DOCUMENTS

| | | |
|---|---|---|
| 3627002 | 2/1988 | (DE) . |
| 0237454 | 9/1987 | (EP) . |
| 0311808A3 | 4/1989 | (EP) . |
| 0380290 | 8/1990 | (EP) . |
| 2616607 | 12/1988 | (FR) . |
| 1530814 | 11/1978 | (GB) . |
| 2221121 | 1/1990 | (GB) . |
| 59-75744 | 4/1984 | (JP) . |
| 4-7141 | 2/1992 | (JP) . |
| 61-174243 | 8/1996 | (JP) . |

OTHER PUBLICATIONS

Miles, U.S. Statutory Invention Registration No. H417, "Headset for Ambient Noise Suppression," published Jan. 5, 1988.

Carter, "Active Noise Reduction," Bose Corporation, Aerospace Medical Research Laboratory, Wright Patterson Air Force Base, Ohio, Jan. 1984.

*Primary Examiner*—David R. Hudspeth
*Assistant Examiner*—Martin Lerner
(74) *Attorney, Agent, or Firm*—Finnegan, Henderson, Farabow, Garrett & Dunner, LLP

(57) ABSTRACT

A remotely installed transmitter capable of clearly picking up only the voice of a person who is talking despite being installed away from the speaker's mouth and without causing feedback despite increased sensitivity, and a hands-free two-way voice terminal device using such a transmitter. In the remotely installed transmitter, a bidirectional microphone is installed at a central position of two pipes, two sound pick-up chambers are formed on both the right side and the left side of the pipes, the two sound pick-up chambers are stuffed with a sound-absorbing material, the shapes and sizes of the sound pick-up chambers are determined so that minimum voice resonance frequencies of the two sound pick-up chambers when they are not stuffed with the sound-absorbing material are both higher than the used upper-limit frequency of voice of the transmitter, and the amount of the sound-absorbing material is adjusted so that the voice frequency characteristics acquire monotonous attenuation characteristics in a voice frequency band higher than the used upper-limit frequency of voice.

12 Claims, 18 Drawing Sheets

U.S. PATENT DOCUMENTS

| | | | |
|---|---|---|---|
| 3,927,279 | 12/1975 | Nakamura et al. | 179/107 |
| 3,963,881 | 6/1976 | Fraim et al. | 179/111 E |
| 3,995,124 * | 11/1976 | Gabr | 381/361 |
| 4,006,318 | 2/1977 | Sebesta et al. | 179/121 C |
| 4,009,355 | 2/1977 | Poradowski | 179/121 D |
| 4,017,797 | 4/1977 | Laessig | 325/16 |
| 4,112,384 | 9/1978 | Buchberger | 330/141 |
| 4,363,937 * | 12/1982 | Bruna | 381/360 |
| 4,401,859 * | 8/1983 | Watson | 381/360 |
| 4,453,046 | 6/1984 | Fidi et al. | 179/146 R |
| 4,463,222 | 7/1984 | Poradowski | 179/121 D |
| 4,489,442 | 12/1984 | Anderson et al. | 381/81 |
| 4,506,381 | 3/1985 | Ono | 381/94 |
| 4,517,415 | 5/1985 | Laurence | 179/107 |
| 4,591,668 | 5/1986 | Iwata | 179/121 C |
| 4,654,883 | 3/1987 | Iwata | 455/89 |
| 4,672,674 * | 6/1987 | Clough et al. | 381/94.7 |
| 4,696,045 | 9/1987 | Rosenthal | 381/114 |
| 4,720,857 | 1/1988 | Burris et al. | 379/430 |
| 4,771,472 | 9/1988 | Williams, III et al. | 381/94 |
| 4,862,509 | 8/1989 | Towsend | 381/163 |
| 4,932,063 * | 6/1990 | Nakamura | 389/94.7 |
| 4,975,966 | 12/1990 | Sapiejewski | 381/189 |
| 5,036,540 | 7/1991 | Eastmond | 381/47 |
| 5,048,091 | 9/1991 | Sato et al. | 381/107 |
| 5,109,410 | 4/1992 | Suhami et al. | 379/430 |
| 5,134,659 | 7/1992 | Moseley | 381/72 |
| 5,164,984 | 11/1992 | Suhami et al. | 379/444 |
| 5,193,117 * | 3/1993 | Ono et al. | 381/94.7 |
| 5,210,803 | 5/1993 | Martin et al. | 381/68 |
| 5,212,551 | 5/1993 | Conanan | 358/143 |
| 5,212,764 * | 5/1993 | Ariyoshi | 381/94.7 |
| 5,226,076 * | 7/1993 | Baumhauer, Jr. et al. | 381/356 |
| 5,235,637 | 8/1993 | Kraz et al. | 381/94 |
| 5,280,524 | 1/1994 | Norris | 379/430 |
| 5,363,444 | 11/1994 | Norris | 379/430 |
| 5,371,803 | 12/1994 | Williamson, III | 381/104 |
| 5,381,473 * | 1/1995 | Andrea et al. | 381/94.7 |
| 5,442,713 * | 8/1995 | Patel et al. | 381/360 |
| 5,461,223 | 10/1995 | Butturini et al. | 235/462 |

* cited by examiner

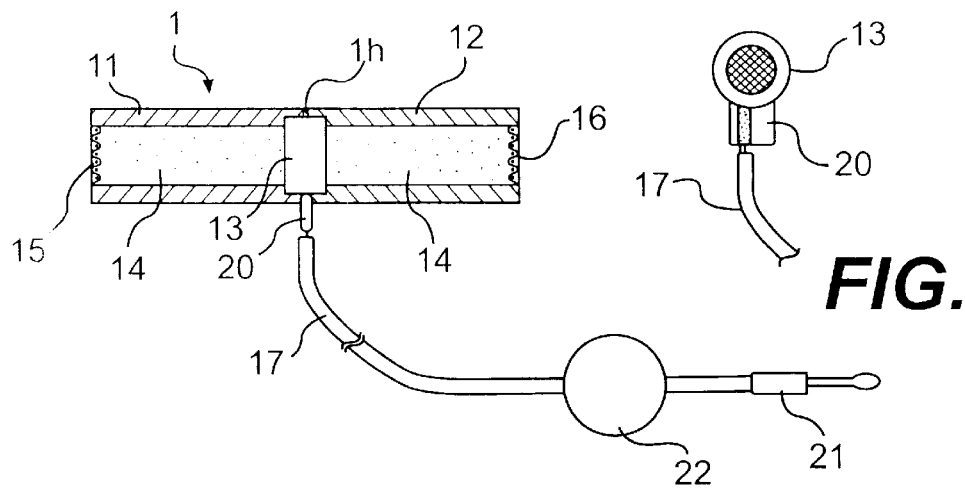
FIG. 1B
FIG. 1A
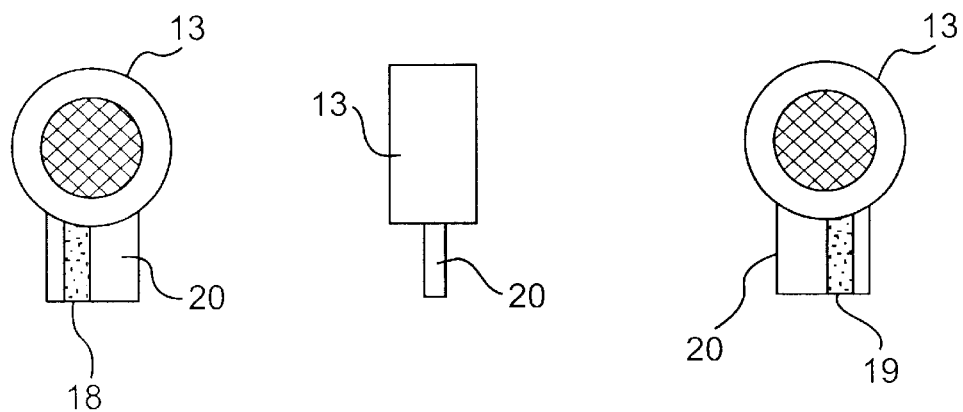
FIG. 2A    FIG. 2B    FIG. 2C

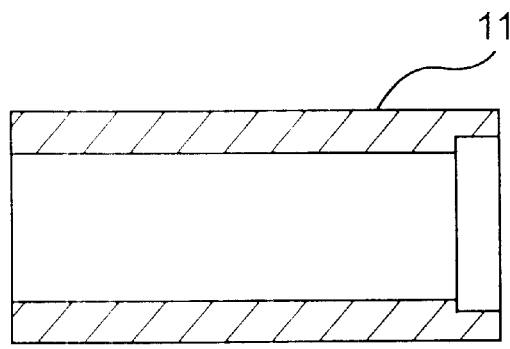
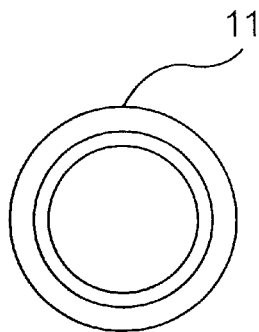
FIG. 3A  FIG. 3B
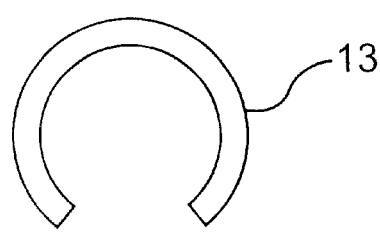
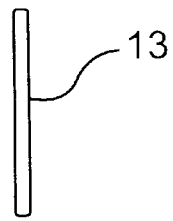
FIG. 4A  FIG. 4B

FIG. 7

| Lo (Lo=Lr=LM/2) | f1 : PRIMARY RESONANCE f1 | | | f2 : SECONDARY RESONANCE f2 | | | f3 : TERTIARY RESONANCE f3 | | |
|---|---|---|---|---|---|---|---|---|---|
| | CALCULATED | BIDIRECTIONAL MICRO | UNIDIRECTIONAL MICRO | CALCULATED | BIDIRECTIONAL | UNIDIRECTIONAL | CALCULATED | BIDIRECTIONAL | UNIDIRECTIONAL |
| | Hz | Hz | Hz | Hz | Hz | Hz | Hz | Hz | Hz |
| 12cm | 717 | 700 | 712 | 2,150 | 2,130 | 2,140 | 3,580 | 3,580 | 3,600 |
| 10cm | 860 | 840 | 854 | 2,580 | 2,550 | 2,570 | 4,300 | 4,380 | 4,380 |
| 8cm | 1,075 | 1,060 | 1,070 | 3,230 | 3,150 | 3,200 | 5,380 | 5,400 | 5,400 |
| 6cm | 1,430 | 1,400 | 1,430 | 4,300 | 4,200 | 4,460 | 7,170 | 7,190 | 7,230 |
| 4cm | 2,150 | 2,070 | 2,130 | 6,450 | 6,420 | 6,480 | 10,750 | 10,500 | 10,500 |
| 3cm | 2,870 | 2,700 | 2,930 | 8,600 | 8,600 | 8,800 | 14,300 | 14,100 | 14,200 |
| 2cm | 4,300 | 4,540 | 4,400 | 12,900 | 13,800 | 13,800 | 21,500 | — | — |
| 1cm | 8,600 | 8,560 | 8,700 | 25,800 | — | — | 43,000 | — | — |

"A"

"I"

"U"

"E"

"O"

FREQENCY (KHz)

REMOTELY INSTALLED TRANSMITTER AND A HANDS-FREE TWO-WAY VOICE TERMINAL DEVICE USING SAME

BACKGROUND OF THE INVENTION

The present invention relates to a remotely installed transmitter capable of clearly picking up the speaker's voice despite being installed away from the speaker's mouth and to a hands-free two-way voice terminal device using such a transmitter.

In recent years, the use of portable telephones has increased tremendously. Many people carry portable telephones with them and use them in their cars while driving. Usually, however, the portable telephone must be held to use, which is not desirable from the standpoint of careful driving.

Therefore, a device has been developed with which a person can talk using a portable telephone but without using his hands. In this device, a transmitter is installed approximately 30 to 60 cm in front of the driver, such as on the sun visor of the car, and a speaker is installed under the driver's seat or in a similar place.

When the two-way simultaneous speech is conducted using such a transmitter and a speaker, however, the voice level of the speaker becomes less than about one-third that of the ordinary handset-type telephone, which picks up the voice signal close to the mouth, since the transmitter is located at a considerable distance from the mouth of the speaker. Therefore, ambient noise is likely to be picked up, making hands-free communication difficult in a noisy environment. To carry out two-way speech, furthermore, the signal from the speaker must be heard at the same time. Thus, unless the acoustic coupling is decreased between the transmitter and the speaker, feedback and echo occur.

Therefore, the above-mentioned device has been furnished with a circuit which lowers he sensitivity of the transmitter circuit at the time of reception and lowers the sound volume of the receiver circuit at the time of transmission. This prevents the occurrence of feedback and echo during the two-way communication.

SUMMARY OF THE INVENTION

When the external noise at a level nearly equal to, or higher than the voice level of talk enters the transmitter as would happen when the car radio is producing a large sound volume, when the ambient noise is large due to high-speed running of the car, or when the ambient noise is increased as a result of opening a car window, however, the circuit employed in the above-mentioned conventional hands-free device erroneously judges the noise to be speech and erroneously lowers the sound volume of the receiver circuit, hindering voice communication to a serious degree.

In addition, in conventional hands-free devices, the sound volume of transmission and the sound volume of reception are changed over and adjusted by detecting an average value of transmission voice level or reception voice level. Such detection is accompanied, however, by a predetermined change-over delay causing speech to be interrupted during the change-over period.

The present invention has as one of its objects to solve the above-mentioned problems and to provide a remotely installed transmitter that is capable of clearly picking up only the voice of the speaker despite being installed away from the speaker's mouth and that does not cause feedback despite increased sensitivity, and to provide a hands-free type two-way voice terminal device using such a transmitter.

It is also desirable to provide remotely installed transmitter wherein a bidirectional microphone is installed at a central position in a pipe having a predetermined length. Sound pick-up ports are formed at suitable positions at least at the right and left ends of the pipe, and two sound pick-up chambers are formed in the pipe, one on the right side of the microphone and the other on the left side of the microphone. The two sound pick-up chambers are stuffed with a sound-absorbing material. The shapes and sizes of the sound pick-up chambers are determined so that minimum voice resonance frequencies of the two sound pick-up chambers when they stuffed with the sound-absorbing material are both higher than the used upper-limit frequency of voice of the transmitter. The amount of the sound-absorbing material is adjusted so that the voice frequency characteristics acquire monotonous attenuation characteristics in a voice frequency band higher than the used upper-limit frequency of voice.

Furthermore, it is desirable that the shapes and sizes of the two sound pick-up chambers are determined so that minimum voice resonance frequencies of the two sound pick-up chambers when they are not stuffed with the sound-absorbing material are both higher than the used upper-limit frequency of voice of the transmitter. The amount of the sound-absorbing material is adjusted so that the sensitivities at minimum voice resonance frequencies of the sound pick-up chambers after being stuffed with the sound-absorbing material are not higher than twice the sensitivity at 1 KHz. Furthermore, the frequency response of the transmitter starts showing a monotonously attenuating response at the high frequency response range, and is higher than two-thirds of the used upper limit frequency of the voice frequency band of the transmitter. The length from the tip of the pipe to the central position of the microphone is selected to be not longer than ¼ of the wavelength of the used upper-limit frequency of voice of the transmitter.

It is further desired to connect an ambient noise suppressing circuit to the output terminal of the bidirectional microphone, the ambient noise suppressing circuit having such amplification characteristics that the amplification gain thereof increases with an increase in the output level of the microphone. The ambient noise suppressing circuit comprises a gain controller for amplifying an output signal of the microphone, a band amplifier for passing signals of a particular frequency band only among the signals output from the bidirectional microphone, a peak detector for detecting a peak value of the signals that have passed through the band-pass amplifier, and a holding circuit for holding the peak value output by the peak detector for a predetermined period of time to control the amplification gain of the gain controller depending upon the peak value.

The two-way voice terminal device of the present invention is preferably equipped with a transmitter and a receiver that can be used hands-free, the transmitter being remotely installed, wherein the receiver is mounted on a first fixing portion being directed to the ear of the speaker, and the transmitter being mounted on a second fixing portion remote by a predetermined distance from the mouth of the speaker in a manner that a tip of the pipe is directed toward the speaker.

Furthermore, it is desirable that the receiver and the transmitter are arranged within a vehicle. The receiver may be mounted on a center pillar and the transmitter may be mounted on a sun visor. Or, the receiver may be mounted on a side surface of a headrest of a seat and the transmitter may be mounted on the other side surface of the headrest. Or, the receiver and the transmitter may be mounted on a belt member detachably attached to the headrest of the seat, the receiver and the transmitter being located on the right and left sides of the headrest to be separated away from each other.

BRIEF DESCRIPTION OF THE DRAWINGS

FIG. 1(A) is a sectional view of a remotely installed transmitter according to the present invention;

FIG. 1(B) is a right front view of the transmitter of FIG. 1(A);

FIG. 2(A) is a left front view of the bidirectional microphone shown in FIG. 1(A);

FIG. 2(B) is a side view of the bidirectional microphone;

FIG. 2(C) is a right front view of the bidirectional microphone;

FIG. 3(A) is a sectional view of the pipe shown in FIG. 1(A);

FIG. 3(B) is a side view of the pipe;

FIG. 4(A) is a front view of the packing shown in FIG. 1(A);

FIG. 4(B) is a side view of the packing;

FIG. 7 is a chart of measured data of voice resonance frequencies;

DESCRIPTION OF THE PREFERRED EMBODIMENTS

Figure 5:
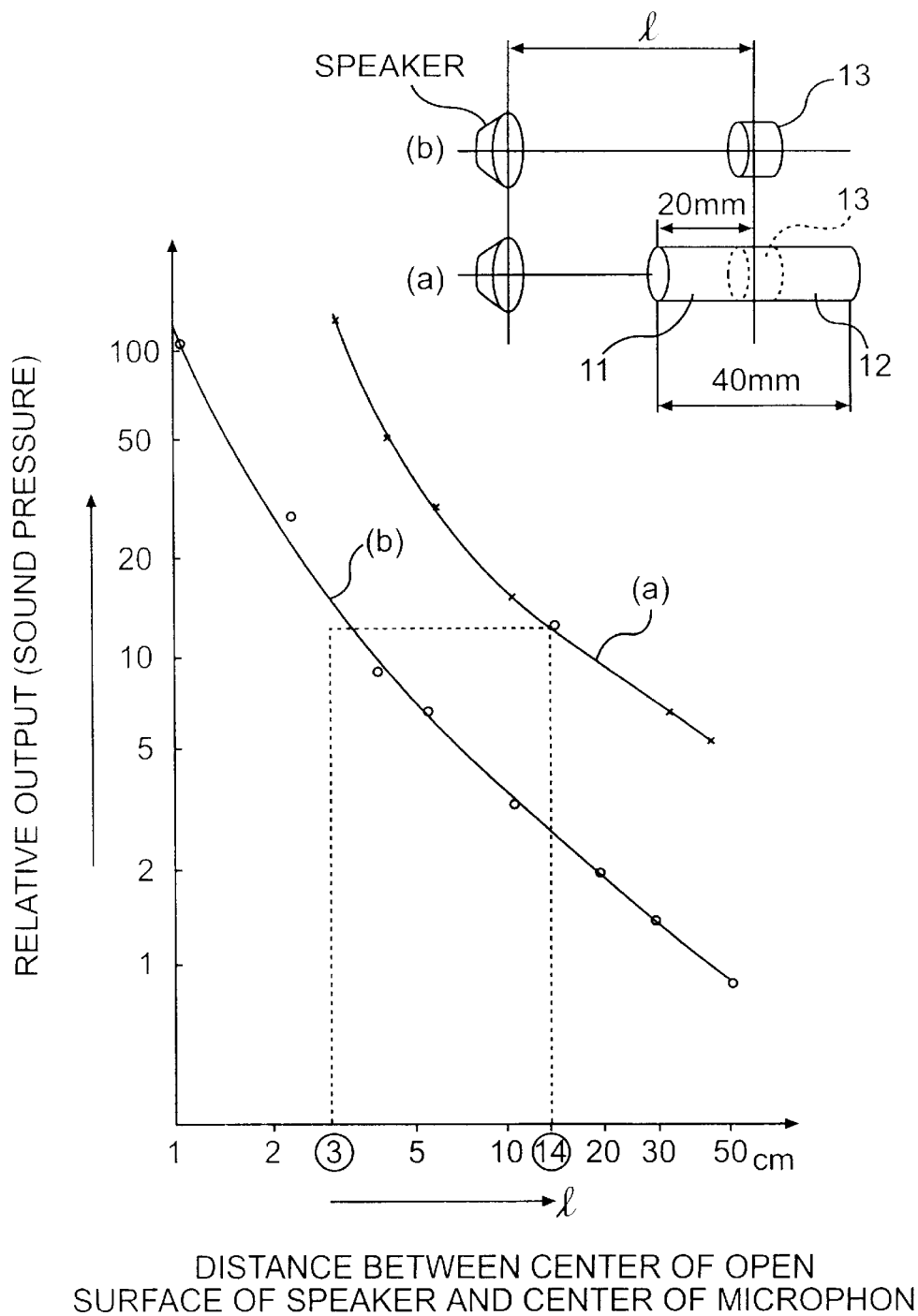
FIG. 5 is a graphical representation of the sensitivity characteristics relative to the distance between the bidirectional microphone and the sound source.

Embodiments of the present invention will now be described with reference to the drawings.

FIGS. 1 through 4 illustrate a remotely installed transmitter according to a first embodiment of the present invention, wherein FIG. 1 illustrates the structure of the transmitter, FIG. 2 illustrates the structure of the bidirectional microphone, FIG. 3 illustrates the structure of the pipe, and FIG. 4 illustrates the structure of the packing.

Reference numeral 1 denotes generally a transmitter comprising pipes 11 and 12. An electret-type bidirectional microphone 13 is preferably contained at a position where pipes 11 and 12 are connected together. Sound-absorbing material 14 is contained in the pipes 11 and 12 and nets 15 and 16 are attached to the openings at both ends of the pipes 11 and 12 to constitute sound pick-up ports. The pipes 11 and 12 are adhered together with an adhesive or the like sandwiching therebetween packing 14 in the shape of a ring that is cut and is composed of rubber or like material. A lead wire 17 connects the positive and negative electrodes 18 and 19 of electrode plate 20 of the bidirectional microphone 13. Plug 21 is connected to an end of lead wire 17. A case 22 contains an ambient noise suppressing circuit 5 (not shown) in the form of an IC, which will be described below.

The transmitter 1 preferably includes a bidirectional microphone 13. It is, however, also possible to use two monodirectional microphones with their backs facing each other, to take out a differential signal between the two microphones. In such a transmitter, the direction of a maximum sensitivity is nearly in the axial direction of the pipe and the direction of a minimum sensitivity is at right angles with the axial direction of the pipe. Therefore, transmission signals having the largest SN ratio are obtained when the transmitter is so arranged that the axial direction of the pipe is headed toward the source of sound from where the sound should be picked up but is at right angles with the direction of the source of ambient noise.

The sensitivity of transmitter 1 in the axial direction of pipes 11 and 12 varies in proportion to the difference in the sound pressure levels at the two sound pick-up ports from the sound source, and the sound pressure level varies nearly in proportion to the distance between the source of sound and the sound pick-up port. Accordingly, the sensitivity increases nearly in proportion to the length of pipes 11 and 12. Based upon this fact, the transmitter 1 with the bidirectional microphone 13 exhibits greater sensitivity than that of the bidirectional microphone 13 alone, and a sensitivity which is suitable is obtained even when the transmitter 1 is installed at a remote place.

FIG. 5 is a graphical representation of the sensitivity characteristics of the transmitter 1 using pipes 11 and 12. Curve (a) represents characteristics when the pipes 11 and 12 have a length of 2.0 cm and an inner diameter of 6.0 mm. Curve (b) represents characteristics when only a bidirectional microphone 13 is used. As seen from FIG. 5, the bidirectional microphone 13 that is contained in the pipes 11 and 12 makes it possible to avoid a reduction in the sound pick-up sensitivity. As shown in FIG. 5, when pipes 11 and 12 having a length of 2.0 cm are attached to both sides of the bidirectional microphone 13, a sound pressure which is obtained at a position of 3 cm away from the mouth when the microphone 13 alone is used is obtained at a position of 14 cm away from the mouth.

However, the sound pick-up chamber in the pipes 11 and 12 of the transmitter 1 works as a cavity resonator when it is not stuffed with the sound-absorbing material 14 and exhibits a specific voice resonance mode determined by the shape and size of the sound pick-up chamber. The bidirectional microphone 13 has a diameter which is usually from 6 to 9 mm, and the sectional area of the sound pick-up chamber in the axial direction of the pipes 11 and 12 is usually much smaller than the wavelength of the voice. Therefore, the voice in the sound pick-up chamber assumes nearly a plane wave, and the voice resonance mode is nearly determined depending upon the length of the sound-pick up chamber, i.e., depending upon the length of pipes 11 and 12. When the length of the pipes 11 and 12 is increased in order to increase the sensitivity of the transmitter 1, defects develop as described below.

First, the voice resonance frequency specific to the sound pick-up chamber decreases with an increase in the length of the pipes 11 and 12. As the minimum voice resonance frequency becomes lower than a used upper-limit frequency of voice, therefore, it becomes no longer possible to flatten the voice frequency characteristics of the voice sensitivity of the transmitter 1 in the voice band that is used no matter how the sound-absorbing material 14 is selected and its amount is adjusted. The sound quality is thereby deteriorated and feedback occurs near the resonance frequency of the voice.

Second, for ambient noise from distant sources, the sound pressure levels become nearly equal at the two sound pick-up ports and are canceled by each other in the transmitter 1. For the ambient noise entering from the axial direction of pipes 11 and 12, however, a phase difference θd occurs between the two sound pick-up ports as expressed by, θd=360°×(f·Ld/V) (degrees), where Ld is the distance between the two sound pick-up ports (nearly twice as long as the pipe I*a*);
V is the speed of sound (344 m/s at 20° C.); and
f is the frequency of the ambient noise.

Therefore, the phase difference θd increases with an increase in the distance Ld between the sound pick-up ports and the effect of canceling the noise in the axial direction decreases as f increases, i.e., decreases toward the high frequency side, and the ambient noise suppression effect decreases.

In order to realize a transmitter that picks up and maintains good quality sound, suppresses the feedback and favorably suppresses ambient noise, therefore, it becomes necessary to select an optimum pipe length. Such is a method is described below.

With a suitable pipe length, the device exhibits flat characteristics up to the used upper-limit frequency of voice and exhibits such voice frequency characteristics that the sensitivity monotonously attenuates when the used upper-limit frequency of voice is exceeded. In other words, the device realizes a monotonously attenuating low-pass filter with its cut-off frequency, fc, located in the neighborhood of the upper-limit frequency of voice, mn.

Assuming the monotonously attenuating characteristics of 6 dB/octave, it is practical to design a filter with the first Butterworth type filter. Under this design, the following relationship exists:

$$P(f) = \frac{P0}{\sqrt{1+\left(\frac{f}{fc}\right)^2}}, \text{ where}$$

f is the voice frequency;
fo is the center frequency of the used frequency range (approximately 1 Khz);
fc is the high cut-off frequency at which the sensitivity of the microphone declines to 3dB level from Po;
fFL is the frequency at which the sensitivity of the microphone declines to −1.5 dB level from Po, which is not perceptible by people;
Po is the microphone sensitivity at the fo frequency; and
P(f) is the microphone sensitivity.

If f is equal or smaller than fFL, the sensitivity P(f) does not change much and is almost flat over this frequency range. If f is higher than fFL, the sensitivity (P(f) shows a monotonous decline. Calculating fFL which generates a −1.5 dB decline as to the microphone sensitivity results in the following:

fFL=0.642×fc≈⅔×fc

At the upper limit voice frequency fuL of the microphone, the microphone should show a 3 dB decline. Therefore, the following formula applies:

fuL≦fc≈3/2×fFL

Therefore, the following formula exists:

fFL≧⅔×fuL

This conclusion shows that the frequency at which the frequency response of the transmitter starts showing a monotonously attenuating response at the high frequency response range, is higher than two-thirds of the used upper limit frequency of the voice frequency band of the transmitter.

This formula shows that the starting frequency of the monotonous decline should be ⅔ times of the upper limit voice frequency.

For example, the used upper-limit frequency of voice will be about 3.3 KHz in the case of a telephone transmitter and about 5.5 KHz when a transmitter for recognizing voice signals is used in a computer. Within the ranges usually used by people, the used upper-limit frequency of voice will be not lower than approximately 2 KHz but not higher than approximately 10 KHz.

As shown in FIGS. 6(A)–6(C), the resonance mode of a voice signal when the sound pick-up chamber comprising pipes 11 and 12 has a cylindrical shape, is a vibration mode of an open pipe of an air cylinder with the vibration membrane of the microphone as a final end and the tip of the pipe as an open end, and in which the sound pressure becomes maximal at the final end and minimal at the open end.

If the length of the open pipe (distance from the tip of the pipe to the vibration membrane of the microphone) is denoted by $L_0$ and the speed of sound by V (344 m/s at 20°

C.), the voice frequency resonates at frequencies of odd number times $V/4L_0$, i.e., at $V/4L_0$, $3V/4L_0$, $5V/4L_0$, . . . Therefore, the minimum voice resonance frequency is $V/4L_0$.

Next, it is presumed that the transmitter is installed at a place very remote from the source of signal sound by more than about 20 times as great as the length Lp of the pipe, the axial direction of the pipe being directed toward the source of signal sound.

Here, if the distance between the two sound pick-up ports (about twice as long as the pipes 11 and 12) is denoted by Ld, the speed of sound in the air is denoted by V (344 m/s at 20° C.), a particular frequency of the source of signal sound by f, and the phase difference between the two sound pick-up ports for the particular frequency f is denoted by θd then, $$\theta d = 2\pi f \cdot Ld/V \text{ (radian), and}$$

$$Ld \approx 2Lp \approx 2L_0$$

If the sound pressures at the two sound pick-up ports for the frequency f are denoted by $P_1$ and $P_2$, it can be regarded that the sound pressure levels are the same and have the same phase difference at a sufficient distance. Therefore, $$P_1 = k\sin(2\pi ft) \text{ (k is a proportional constant)}$$

$$P_2 = k\sin(2\pi ft + \theta d)$$

Accordingly, the difference P in the sound pressure level between the sound pick-up ports is, $$P = P_2 - P_1 = (2k \cdot \sin \theta d/2) \cdot \cos(2\pi ft + \theta d/2)$$

Accordingly, since the sensitivity Q of t transmitter varies depending upon an absolute value P, $$Q = K \cdot \left|\sin\frac{2d}{2}\right| = K \cdot \left|\sin\left(\frac{2\pi f \cdot L_0}{V}\right)\right|$$

This formula indicates that the sensitivity Q becomes a maximum when $$\frac{2\pi f \cdot L_0}{V} = \left(n - \frac{1}{2}\right)\pi \ (n = 1, 2, 3, \ldots)$$

$$f = \left(\frac{2n-1}{4}\right)\frac{V}{L_0} = \frac{V}{4L_0}, \frac{3V}{4L_0}, \frac{5V}{4L_0}, \ldots$$

which is in agreement with the conclusion derived from above-mentioned theory of resonance.

When the source of signal sound is at right angles with the axial direction of the pipe, there exists no phase difference between $P_1$ and $P_2$; i.e., P=0, or the sensitivity is 0 in theory.

If it is now presumed that the vibration membrane 24 of the microphone exists nearly it the center of the microphone, the length $L_0$ of the open pipe is nearly in agreement with the distance Lc between the tip of the pipe and the center of the microphone. Therefore, the design condition is such that the minimum voice resonance frequency $f_1$ is, $$f_1 = V/4L_0 \approx V/4Lc \geq f_u$$

where $f_u$ is the used upper-limit frequency of voice of the transmitter.

Accordingly, $$Lc \leq \frac{1}{4}V/f_u = \lambda_u/4$$

where $\lambda_u = V/f_u$ (wavelength of the used upper-limit frequency of voice), and, hence, the distance Lc between the tip of the pipe and the center of the microphone must be smaller than one-fourth the wavelength $\lambda_u$ of the used upper-limit frequency of voice.

When the length Lc is shortened, the sensitivity of the transmitter installed at a distance greatly decreases (see FIG. 5). Therefore, greatly decreasing the length Lc is not advantageous. It is therefore desired to limit the lower limit of Lc.

In recent years, it has become possible to estimate words and individual voices by analyzing voice frequencies. In such a case, the transmitter frequency band is covering about twice as high as the used upper-limit frequency $2f_u$ of voice. Hence, the length corresponding to the frequency $2f_u$ may be considered to be the lower limit of Lc. If the length Lc is selected to lie within a range $\lambda_u/8 \leq Lc \leq \lambda_u/4$, then, almost all of the cases can be handled.

Figure 6:
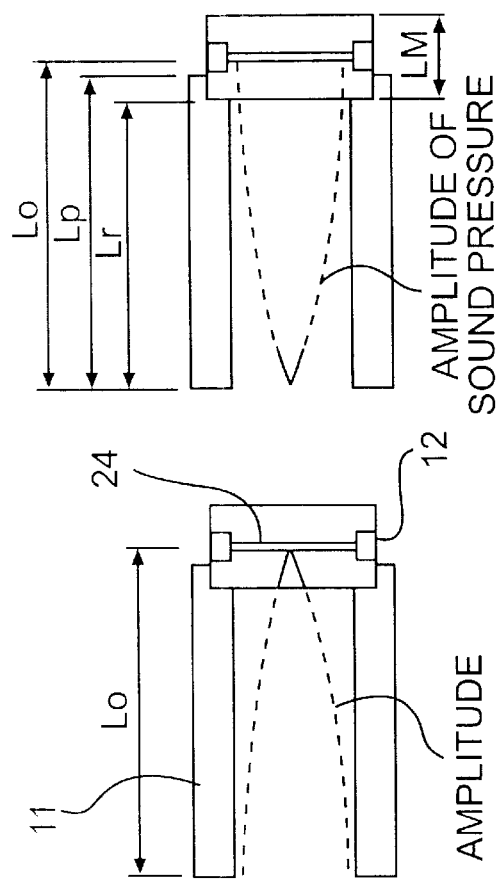
FIGS. 6(A)–6(C) are graphs illustrating the voice resonance state in the sound pick-up chambers in the pipe.

Refering now to FIG. 6, if the length of the open pipe is $L_0$, the length of the pipe is Lp, the length of the sound pick-up chamber is Lr, the thickness of the microphone is Lm, and if the vibration membrane 24 of the microphone exists nearly at the center of the microphone, then, $$L_0 \approx Lc = Lr + L_M/2 \approx Lp) \text{ Lr}$$

In the above formula, when $L_M/2$ is much smaller than Lr, it can be regarded that $L_0 = Lr$ and the above formula approximately holds to a sufficient degree even when the position of the vibration membrane 24 is deviated to some extent from the center of the microphone. The electret-type bidirectional microphone that is now widely used is as small as 6 to 9 mm n diameter and 2 to 6 mm in thickness $L_M$. Therefore, if the length Lr of the sound pick-up chamber is selected to be more than 10 times as long as $L_M/2$, the above equation holds very well.

FIG. 7 is a chart of calculated values and measured values of voice resonance frequencies based on the above mentioned theory.

Figure 8:
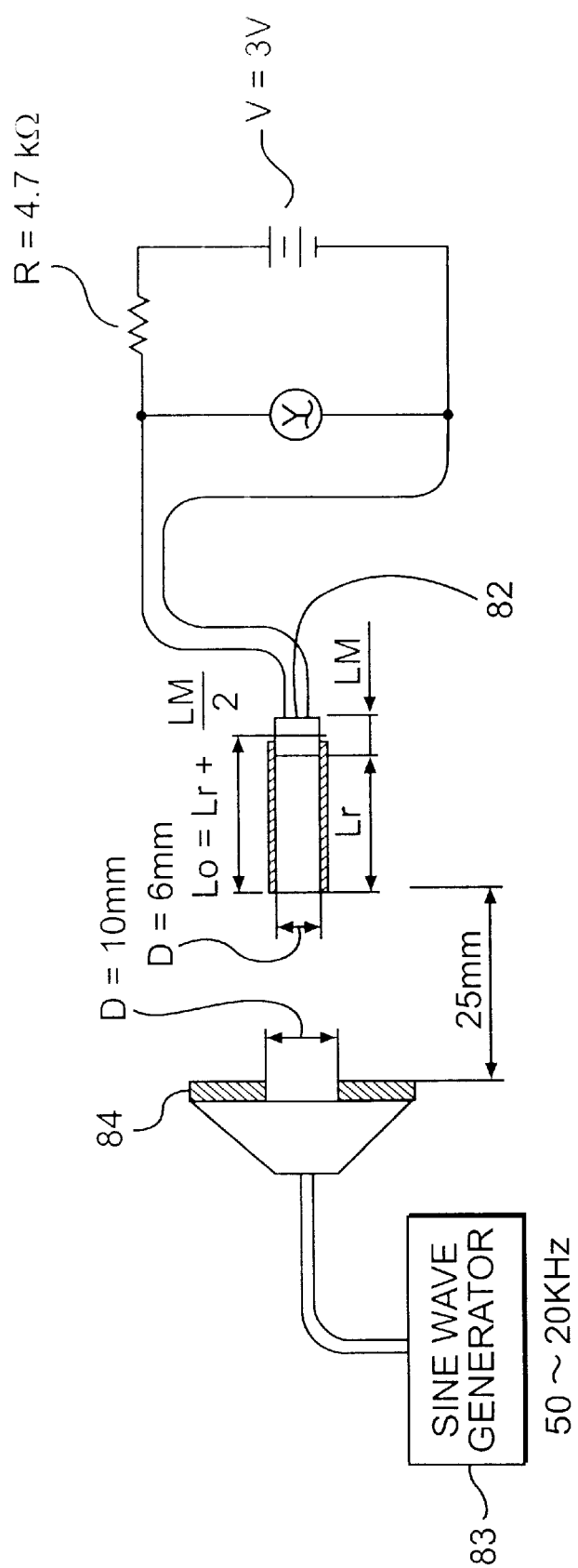
FIG. 8 is a block diagram illustrating a circuit for measuring the voice resonance data.

The data of FIG. 7 was obtained by the measurement of a primary voice resonance frequency ($f_1=v/4L_0$), a secondary voice resonance frequency ($f_2=3V/4L_0$) and a tertiary voice resonance frequency ($f_3=5V/4L_0$) by assuming that $L_0=Lc$ in compliance with the formula previous using a measuring circuit shown in FIG. 8. The entries marked with a dash could not be measured because the speaker band and the microphone band were lower than 20 KHz.

The test apparatus shown in FIG. 8 includes a variable sine wave generator 83, which is coupled to a shielding rubber plate 84 that is approximately 3 mm thick and has a diameter of 10 mm. The shielding rubber plate is approximately 25 mm from the pipe opening, which has a diameter of approximately 6 mm. In the test, a bidirectional microphone having a thickness $L_M$ of 5 mm and a unidirectional microphone having a thickness $L_M$ of 3 mm were used. Microphone 82 is coupled to a load resistance of approximately 4.7 kΩ and a 3 volt power source. Voltage V was measured and the results are shown in FIG. 7.

As is seen from FIG. 7, the measured data of voice resonance frequencies are in very good agreement with the calculated values, and are within ±5% of the calculated values. As will be obvious from the comparison of the measured data of the bidirectional microphone and the measured data of the nondirectional microphone, furthermore, the voice resonance frequencies are irrelevant to the microphone characteristics but are relevant to the length $L_0$ ($\approx$Lc) only of the open pipe.

From the results of FIG. 7, the transmitter used for the telephone has the used upper-limit frequency $f_u$ of voice of 3.3 KHz. In order to avoid resonance within the used upper-limit frequency of voice, therefore, the pipe length Lp must not be longer than 2.6 cm. In the case of the transmitter used for recognizing voice signals, when the used upper-limit frequency $f_u$ of voice is set to be about 7 KHz, the pipe length Lp must not be longer than 1.2 cm to avoid resonance within the used upper-limit frequency of voice.

Described below with reference to FIGS. 9(A) through 9(D) is a method of flattening the voice frequency characteristics in the transmitter of the present invention.

Figure 9:
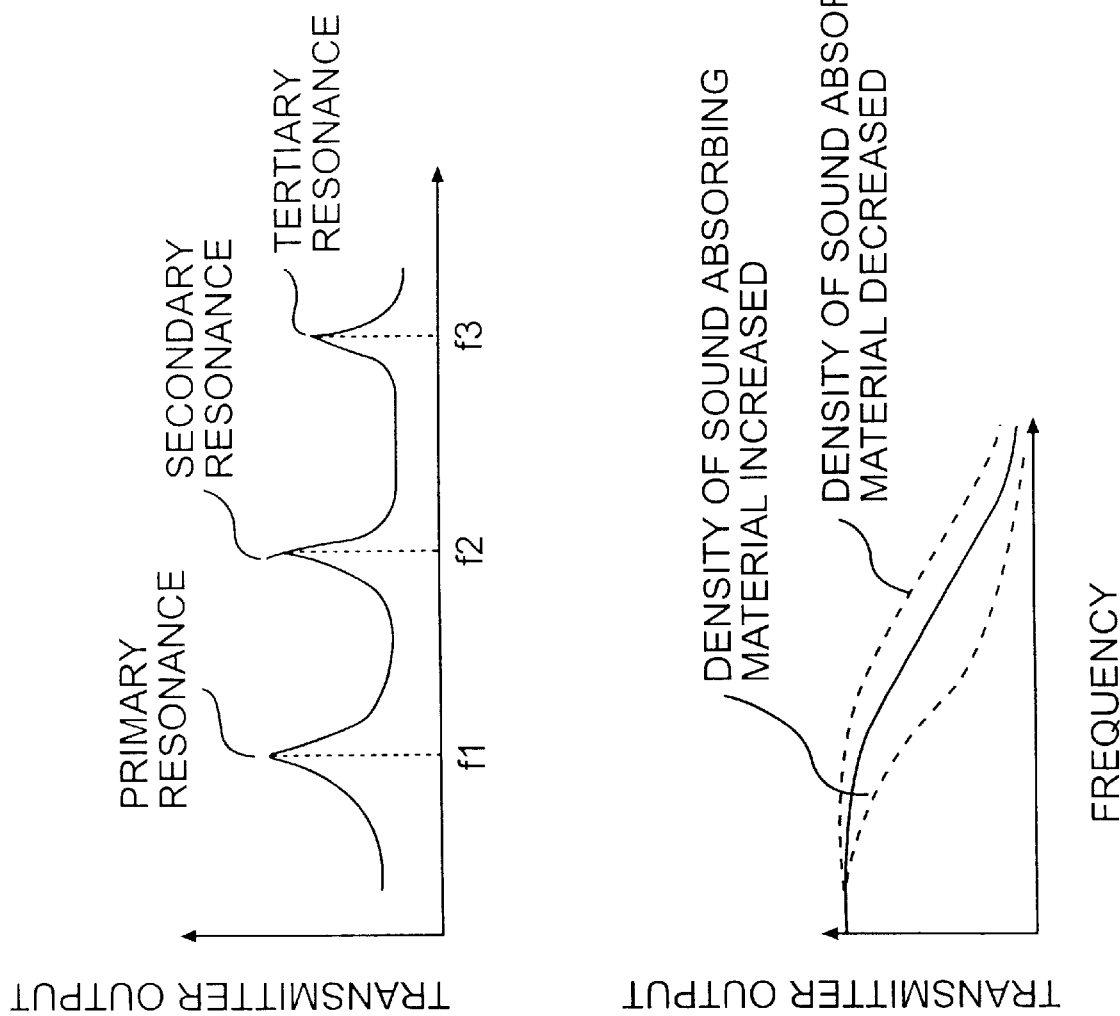
FIGS. 9(A)–9(D) are graphs illustrating the principle of the remotely installed transmitter according to the present invention.
Figure 9:
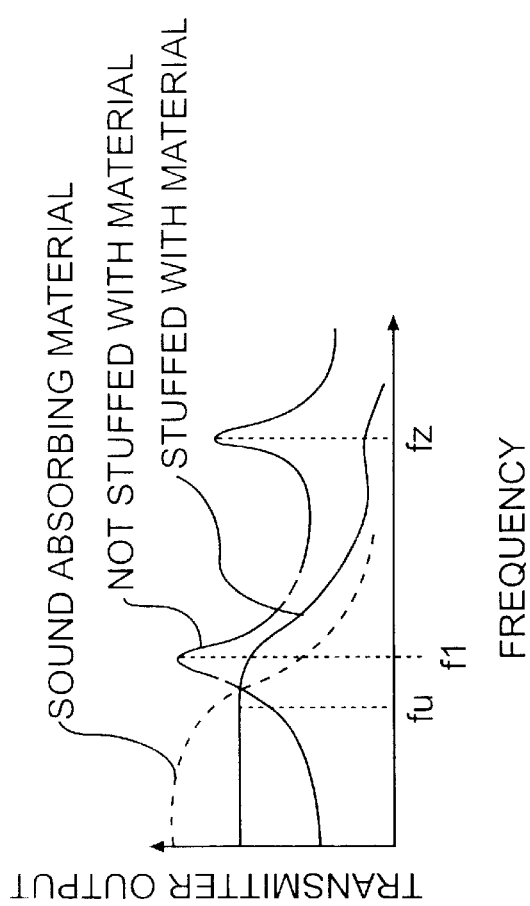
Figure 9:
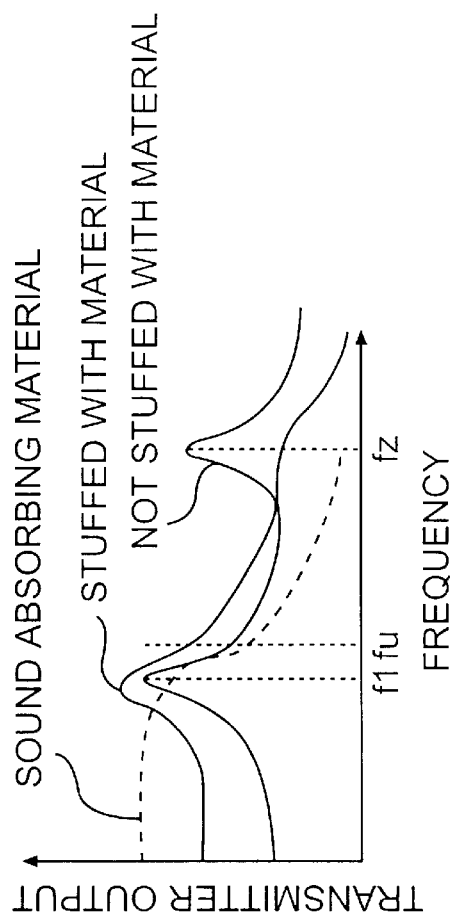

FIG. 9(A) shows voice frequency characteristics of transmitter 1 that is not stuffed with sound-absorbing material 14. It will be understood from this drawing that the sound quality of the transmitter is affected by the resonance mode.

FIG. 9(B) shows voice frequency characteristics of the sound-absorbing material 14. It will be understood from this drawing that the voice frequency characteristics and, particularly, characteristics in a high-frequency region can be changed depending upon the density of the sound-absorbing material 14 that is stuffed within pipes 11 and 12.

The fibrous filter developed for cigarettes can be utilized as the sound-absorbing material 14. High-frequency attenuation characteristics are controlled by changing the fiber density of the filter. In an experiment, a filter having a fiber density of from 15,000 denier to 20,000 denier exhibited favorable results.

FIG. 9C shows voice frequency characteristics when FIG. 9(A) and FIG. 9(B) are combined together. This drawing shows voice frequency characteristics when a minimum voice resonance frequency $f_1$ is higher than the used upper-limit frequency $f_u$ of voice. It will be understood that by suitably selecting the kind of the sound-absorbing material 14 and the amount of stuffing, it is made possible to realize ideal sound frequency characteristics in which the overall voice frequency characteristics of the transmitter 1 are nearly flattened up to near the used upper-limit frequency $f_u$ of voice and the voice frequency characteristics monotonously attenuate as the used upper-limit frequency $f_u$ of voice is exceeded.

The conditions for satisfying such characteristics lie within a range in which the minimum voice resonance frequency $f_1$ is higher than the used upper-limit frequency $f_u$ of voice and the sensitivity at the minimum voice resonance frequency $f_1$ after being stuffed with the sound-absorbing material 14 is lower than two times the sensitivity at 1 KHz which is a center frequency of human voice. Usually, the minimum voice resonance frequency $f_1$ is higher than 2 KHz but is lower than 10 KHz, though it may vary depending upon the purpose of use.

For reference, FIG. 9(D) shows voice frequency characteristics in a case where the minimum voice resonance frequency $f_1$ is smaller than the used upper-limit frequency $f_u$ of voice. In this case, when it is attempted to obtain a transmitter output which is the same as that of a low-frequency band up to near the used upper-limit frequency $f_u$ of voice, a peak takes place due to resonance near the minimum voice resonance frequency $f_1$, which makes it difficult to obtain flat characteristics over the whole frequency region up to near the used upper-limit frequency $f_u$ of voice. Since the gain is high near the peak, feedback tends to occur. Additionally, the sound becomes unnatural because it is emphasized near the minimum voice resonance frequency $f_1$.

The transmitter 1 of the present invention as described above can be used in a manner detailed below. The transmitter 1 is installed at a place away by, at least, more than 10 cm from the mouth of a person who talks, with the open surface at a tip of one pipe 11 being directed toward the speaker. With transmitter 1 being installed as described above, there is a large difference in the level between the voice of the person who is talking that enters from the open surface of the pipe 11 directed to the mouth of the person who is talking and the voice of the person who is talking that enters from the open surface of the pipe 12 located on the opposite side. Therefore, even though the difference is taken by the bidirectional microphone 13, a voice signal of a sufficiently large level is output from the transmitter 1.

Transmitter 1 receives ambient noise together with the voice of the speaker. Usually, however, the sources of ambient noise are much more distant than the transmitter 1 from the mouth of the person who is talking. Therefore, the ambient noise is input at nearly the same level from the right and left pipes 11 and 12 of transmitter 1. Therefore, the bidirectional microphone 13 takes the difference of the two signals to cancel the ambient noise. Therefore, transmitter 1 outputs the speaker's voice as signals at a level considerably higher than that of the ambient noise, and the speaker's voice is clearly transmitted.

Figure 10:
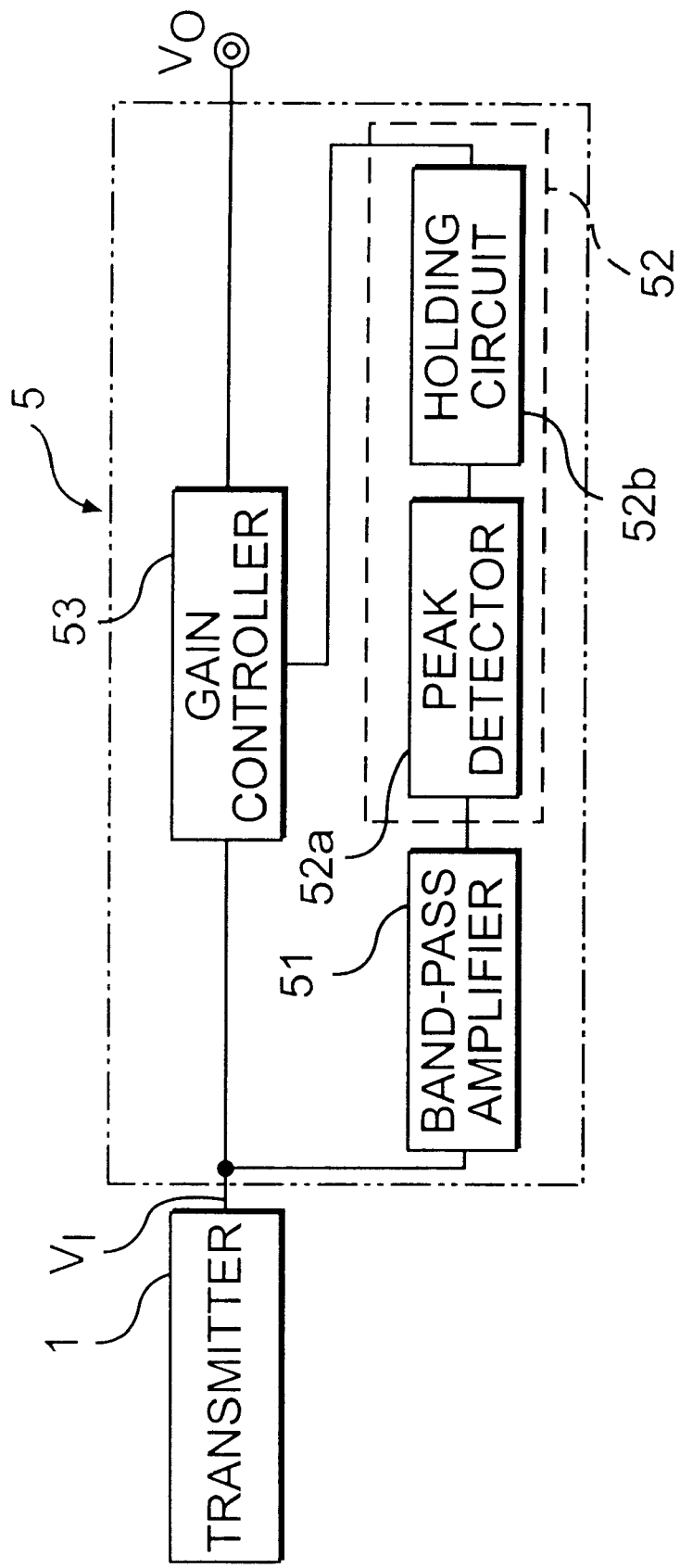
FIG. 10 is a block diagram of an ambient noise suppressing circuit used with the transmittal of the present invention.
Figure 11A:
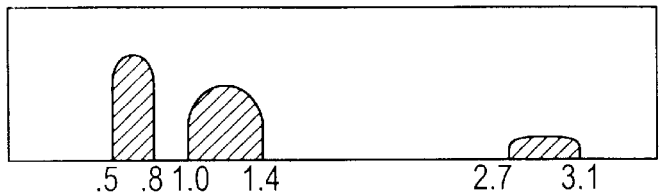
FIGS. 11(A)–11(E) are graphical representations of the frequency characteristics of vowels.
Figure 11B:
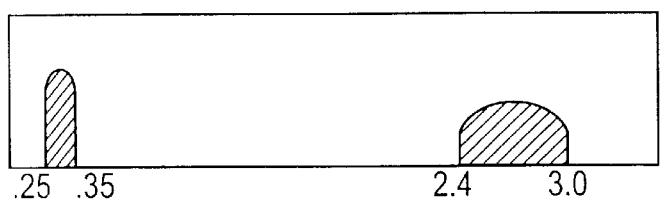
Figure 11C:
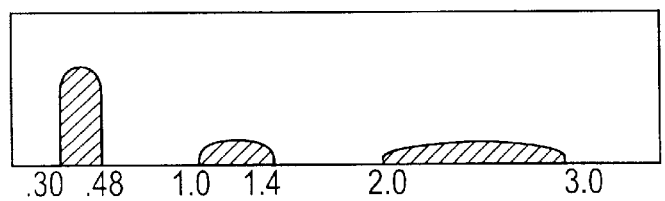
Figure 11D:
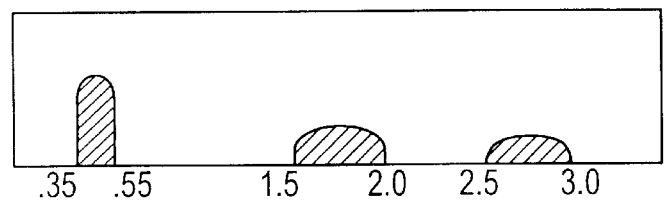
Figure 11E:
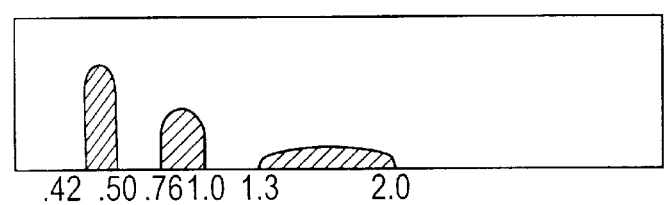

FIG. 10 is a block diagram of the ambient noise suppressing circuit 5 contained in the case 22 of FIG. 1. Using the transmitter 1 with the piped structure described above, the speaker's voice can be clearly picked up while suppressing the ambient noise. With the ambient noise suppressing circuit 5 connected to the transmitter 1, however, the speaker's voice can be transmitted more clearly by suppressing the feedback.

The ambient noise suppressing circuit 5, shown in FIG. 10 is preferably fabricated in the form of an IC chip. Alternatively, software can be added to a computer to perform the ambient noise suppressing function.

As shown in FIG. 10, the noise suppressing circuit 5 preferably includes a band-pass amplifier 51 for passing a band of frequencies of 0.2 to 1 KHz or, for example, 0.2 to 2 KHz. The output of the band-pass amplifier 51 is input to a peak-holding circuit 52, which preferably comprises a peak detector 52a, for detecting a peak value of the sound that has passed through the band-pass amplifier 51, and a holding circuit 52b for holding the peak value detected by the peak detector 52a. The output of holding circuit 52b is output to a gain controller 53, which controls the gain from the transmitter 1b based on the output from the peak-holding circuit 52.

The band-pass amplifier 51 preferably is used for discriminating and detecting voiced and voiceless sound. Most human conversation comprises language voice, and most of the time and energy of language voice is occupied by vowels. FIGS. 11(A)–11(E) show the frequency characteristics of certain vowels. The x-axis shows the frequency in KHz and the y-axis shows the relative sound energy of the different vowels. The vowel sounds are within specific frequency spectra called first, second, and third formants. Among them, the first and second formants occupy the greatest amount of energy. The first formant is distributed over about 0.2 to 1 KHz, and the second formant is distributed over about 0.75 to 2 KHz. Therefore, if the pass band of the band-pass amplifier 51 is set to be approximately 0.2 to 2 KHz, the first and second formants of vowels can be selectively picked up. If the pass band is set to be 0.2 to 1 KHz, primarily the first formant, having the greatest energy, can be selectively picked up.

Ambient noise typically contains frequency components of a low-frequency band (50 to 150 Hz), exemplified by, for example, the sound of cars. Ambient noise can also include a high-frequency band (2 KHz or higher) components, exemplified by, for example, frictional sound. Therefore, when the pass band of the band-pass amplifier 51 set to be 0.2 to 2 KHz or 1.2 to 1 KHz very effective discrimination and pick up of voice signals can be attained.

Figure 12:
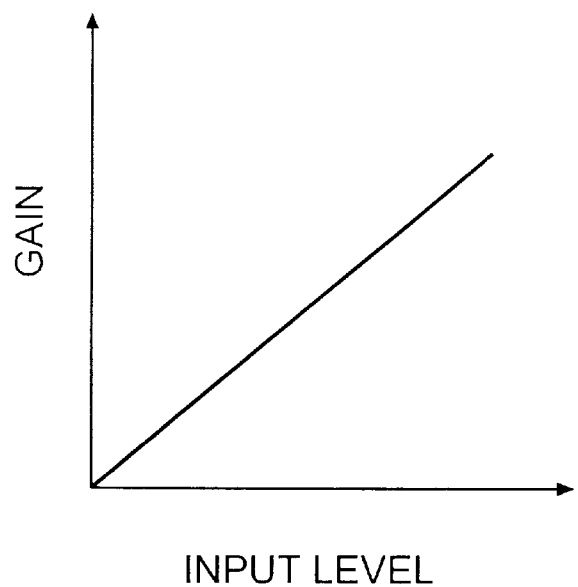
FIG. 12 is a graphical representation of the gain characteristics for the input level of the ambient noise suppressing circuit shown in FIG. 10.
Figure 13:
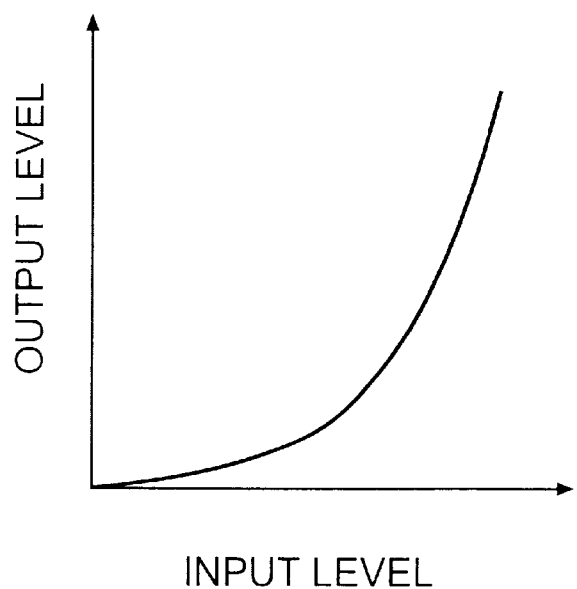
FIG. 13 is a graphical representation of the input/output characteristics of the ambient noise suppressing circuit shown in FIG. 10.

Continuous and smooth control is realized by the ambient noise suppressing circuit 5 by using a gain controller 53 to vary the transmission gains for voiced and voiceless communication. The gain controller 53 preferably controls the gain of the noise suppressing circuit 5 based on the peak-holding value output by the peak holding circuit 52. The peak value is held by the holding circuit 52b, and the amplification gain of the gain controller 53 is controlled as shown in FIG. 12 depending upon the magnitude of the peak value that is held in order to realize input/output characteristics as shown in FIG. 13. Thus, the transmission levels of the voiced section of the speaker and of the voiceless section are continuously and smoothly controlled.

Figure 14:
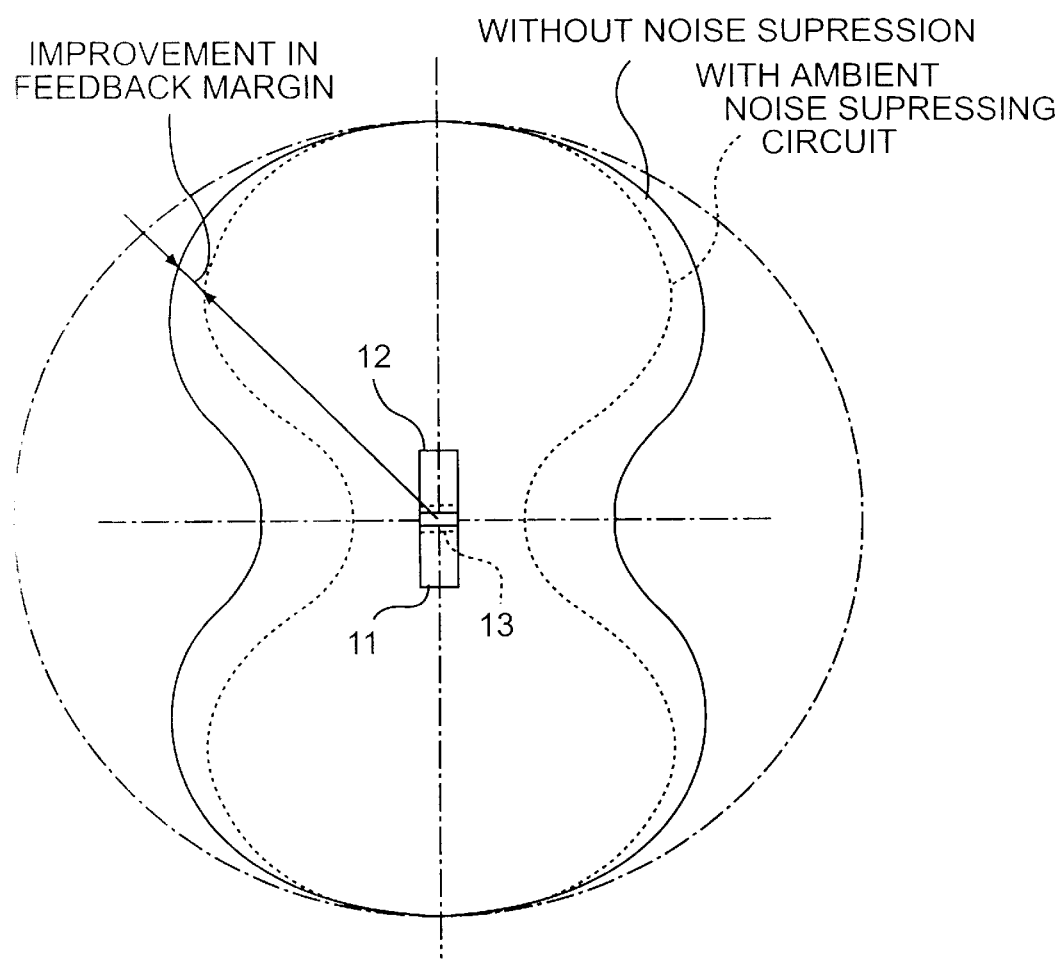
FIG. 14 is a diagram of sensitivity characteristics of the remotely installed transmitter according to the present invention.

When the ambient noise suppressing circuit 5 is connected to the transmitter 1, the overall sensitivity characteristics become as indicated by the dotted line in FIG. 14. Compared with when transmitter 1 alone is used, which is indicated by the solid line, the shape of the sensitivity curve is more constricted over a wide range, contributing to improving the feedback margin in the side directions. Therefore, even when combined with a receiver such as portable telephone, the feedback margin can be further increased compared with when the ambient noise suppressing circuit 5 is not employed.

Figure 15:
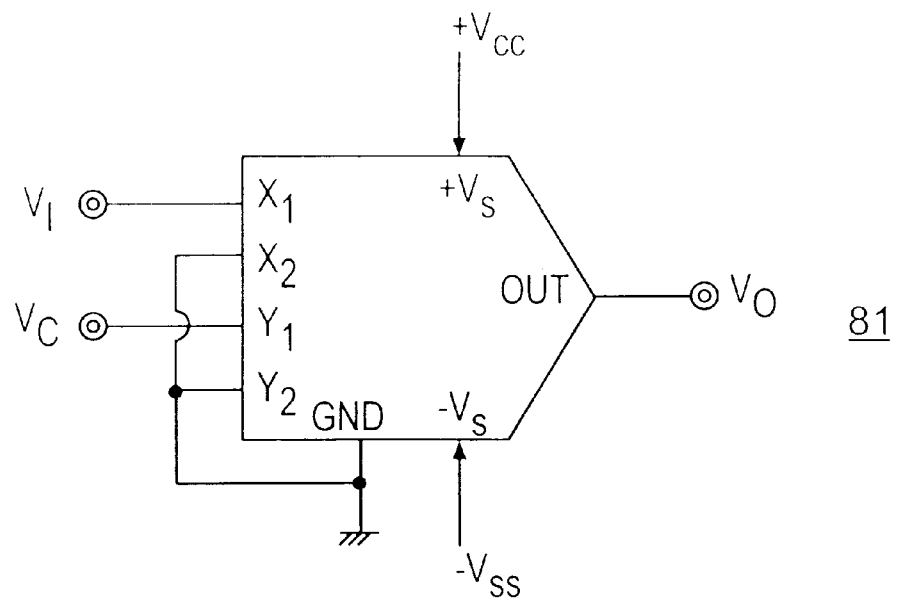
FIG. 15 is a circuit diagram of an exemplary gain controller shown in FIG. 10.

An analog multiplier circuit 81, such as that shown in FIG. 15, is preferably employed as the gain controller 53. The analog multiplier 81 outputs the multiplied result of a gain control signal Vc and an AC output, $V_f$, from transmitter 1. The analog multiplier 81, shown in FIG. 15, outputs a gain control signal $V_0$ in accordance with the following formula:

$$V_0 = K(X_1 = X_2)(Y_1 = Y_2) = K \cdot V_f \cdot Vc$$

in which $V_f$ is an output signal from the transmitter 1b, $V_c$ is a gain control signal, and K is a proportional constant.

The gain G of the gain controller 53 in such a configuration is KvVc.

The gain control signal Vo is a peak-holding value (=amplitude), so that the relationship between the amplitude A and the gain G of the gain controller 53 is proportional. It is also contemplated that an FET multiplier (utilizing a change in the channel resistance of an FET) can be used in place of the above-mentioned analog multiplier 81 as the gain controller 53.

Next, the parameters of the peak-holding circuit 52 are considered. As noted above, when considering the time for holding a voiced section, vowel sounds occupy the greatest amount of spoken language. By considering that the lower limit of the frequency spectrum for the first formant of a vowel not lower than 200 Hz, as shown in FIGS. 11(A) through 11(E), particularly FIG. 11(B), and that the longest period, Tm, of such a vowel is about 5 msec, the peak-holding circuit 52 is preferably set to have a holding time, Th, to hold a peak value of the 5-msec period waveform for a predetermined period of time. The holding time Th is set to be a period of time from which the holding voltage attenuates to approximately 70% of the peak value.

As described above, the gain control circuit 53 is controlled by the output of the peak-holding circuit 52, which has a holding time Th. The gain G from the gain control circuit 53 thus varies in proportion to the loudness of the voice signal of the person who is talking. Hence, the voice signal is not interrupted. Since the output from the peak-holding circuit 52 rises very quickly, a high gain is obtained from the start of conversation, and sound can be produced in a sufficient amount for a person at the other end of the telephone to hear.

The peak-holding circuit 52 also is set to have a time Tf, which determines how quickly the holding voltage should attenuate after a voiced section stops. Assuming an exponential attenuation curve, the time Tf until the output of the peak-holding circuit 52 is attenuated by 99%, which can be regarded as being outside the holding range, can be expressed by the expression Tf=13Th. From this relationship, if the time Tf is shorter than approximately one second, the time of attenuation is short enough for practical conversation. When conversation is finished, therefore, the peak-holding circuit 52 attenuates within a sufficiently short period of time following the peak value of the operation of the voiceless section, making it possible to quickly suppress ambient noise.

Using the relationship between the times Tf and Th described above, an appropriate attenuation time can be set to between 5 and 65 milliseconds, when the peak detector 52a is a unidirectional detection type detector, and can be set to between 2.5 to 32.5 milliseconds when the peak detector 52a is a bidirectional type detector. This attenuation time makes it possible to prevent conversation from unnaturally terminating, which may occur with a holding time that is too short, and makes it possible to prevent ambient noise from being picked up by keeping gain controller 53 at a high gain position G2 for too long.

FIGS. 16 to 19 illustrate alternative embodiments of the transmitter according to the present invention.

Figure 16:
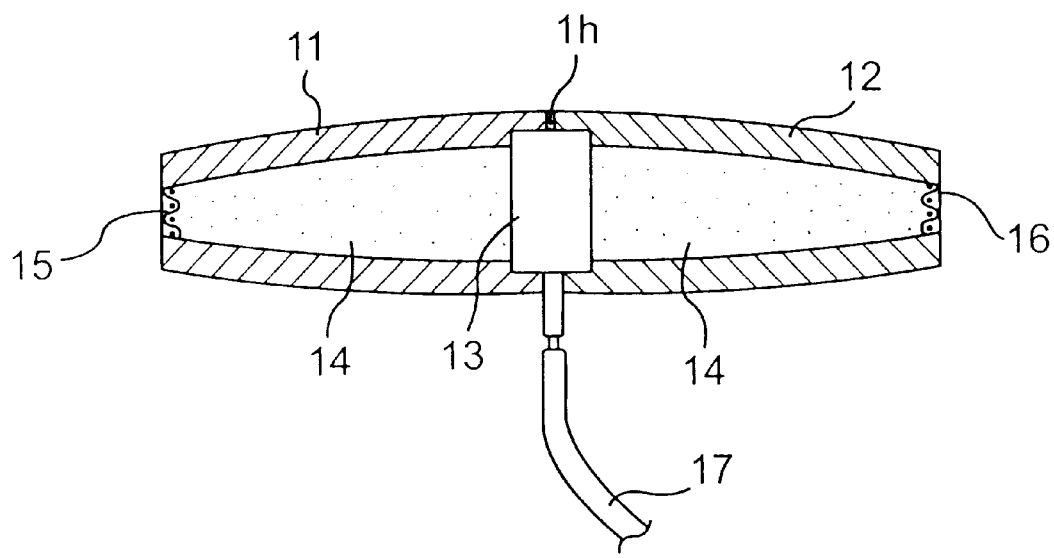
FIG. 16 is a sectional view of a remotely installed transmitter according to a second embodiment of the present invention.
Figure 17:
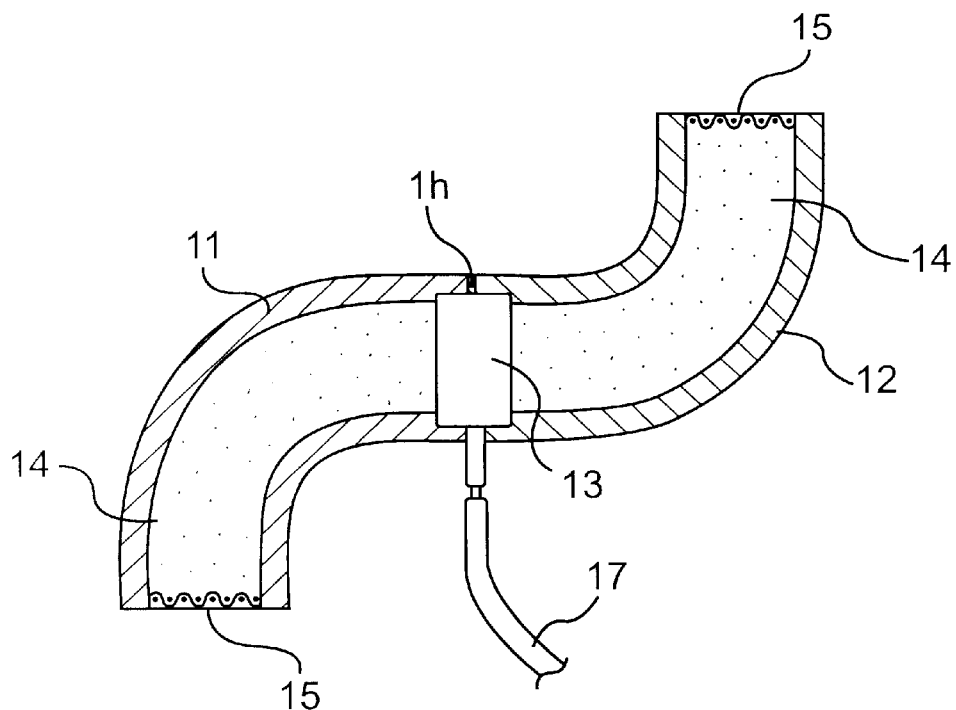
FIG. 17 is a sectional view of a remotely installed transmitter according to a third embodiment of the present invention.
Figure 18:
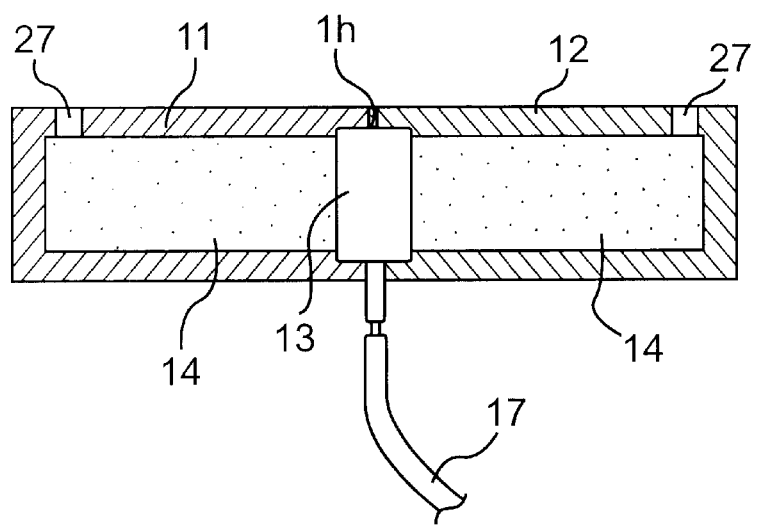
FIG. 18 is a sectional view of a remotely installed transmitter according to a fourth embodiment of the present invention.
Figure 19:
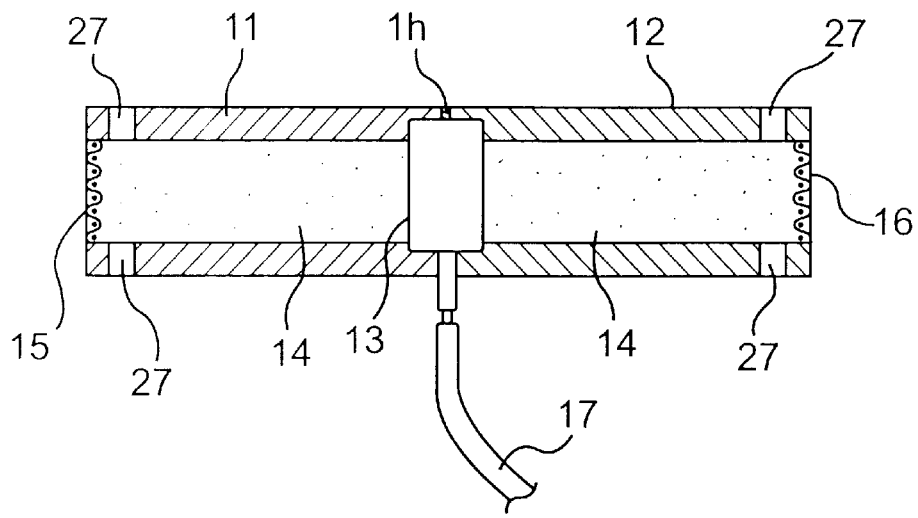
FIG. 19 is a sectional view of a remotely installed transmitter according to a fifth embodiment of the present invention.

FIG. 16 illustrates the pipes 11 and 12 having a spindle shape. FIG. 17 illustrates the pipes 11 and 12 having an L-shape. FIG. 18 illustrates the pipes 11 and 12 having outer end surfaces that are closed and having small holes 27 having a diameter of about 1 to 2 mm for picking up the sound that are perforated in the side surfaces thereof. FIG. 19 illustrates the pipes 11 and 12 having outer end sources that are opened and having a plurality of small holes 27 having a diameter of about 1 to 2 mm that are perforated in the side surface at the outer ends thereof. The shapes of the pipes and the positions of the small holes are not limited to those diagramed but can be changed depending upon the object of use to thereby change sensitivity characteristics of the transmitter.

Figure 20:
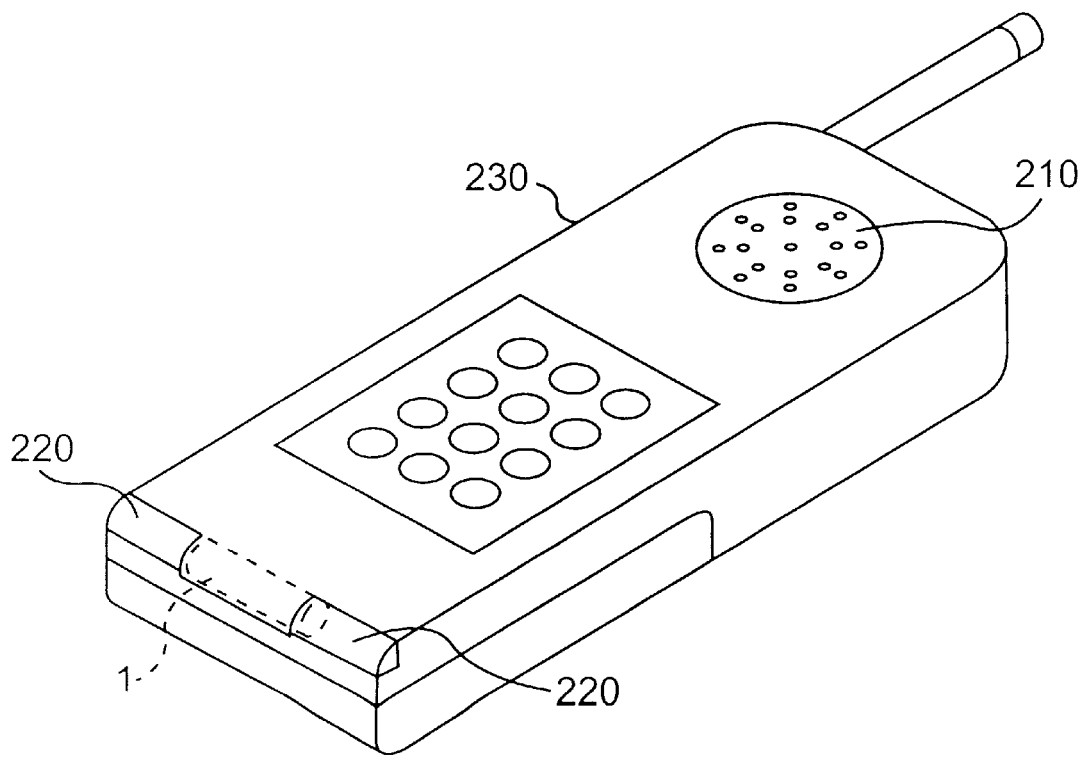
FIG. 20 is a perspective view of a portable telephone (or PHS) using the remotely installed transmitter of the present invention.

FIG. 20 illustrates a portable telephone (or PHS) using transmitter 1 of the present invention. As shown, the receiver 210 is arranged on the upper side of the case 230 and transmitter 1 is situated sideways in the lower portion of case 230. Windshields 220 are provided on the right and left sides of the transmitter 1 to prevent wind noise. The ambient noise suppressing circuit 5 is contained in the case 230.

Figure 21:
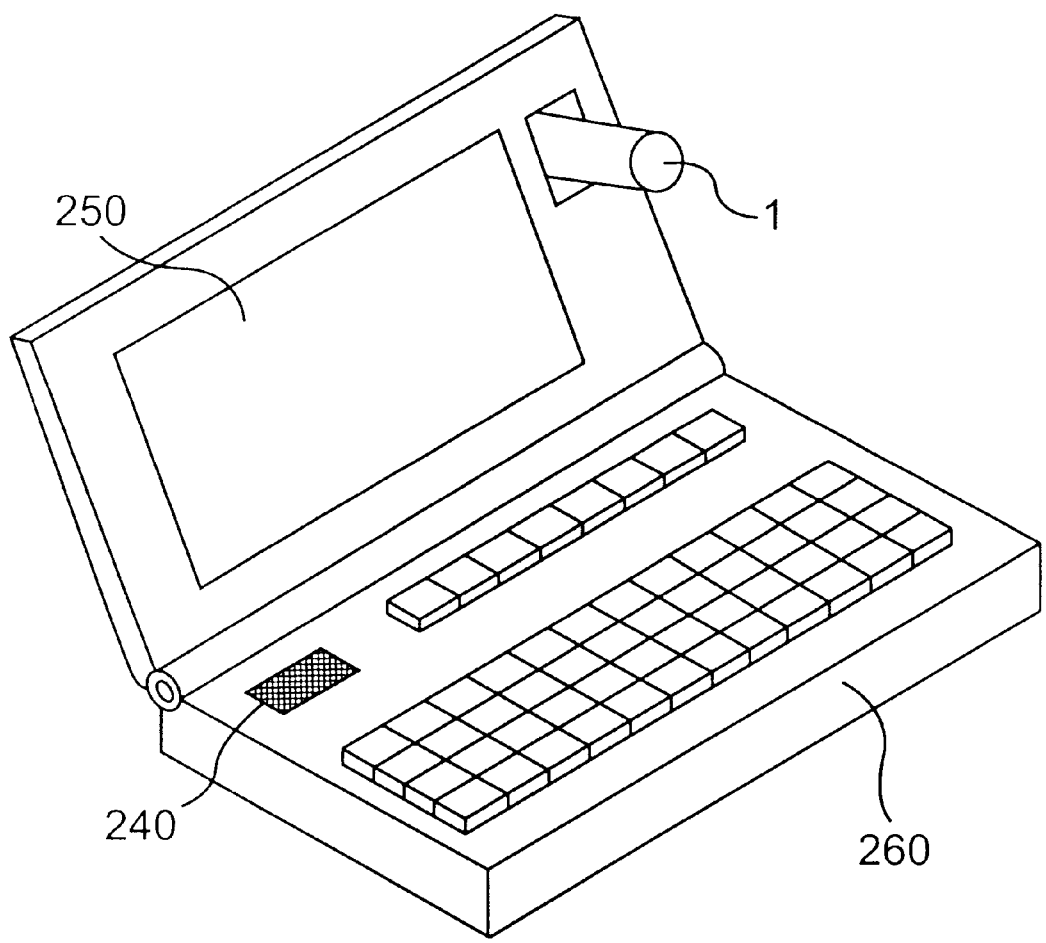
FIG. 21 is a perspective view showing a lap-top computer using the remotely installed transmitter of the present invention.

FIG. 21 illustrates a lap-top computer using the transmitter 1 of the present invention. As shown, a receiver 240 is arranged at the left upper corner of a keyboard body 260, and the transmitter 1 is vertically arranged at the right upper corner of a liquid crystal display screen 250, which is provided inside the opening/closing lid. Transmitter 1 is attached to the opening/closing lid and can freely rotate. When used, transmitter 1 is vertically arranged as shown. When the lid is closed, transmitter 1 is turned and laid down.

Figure 22:
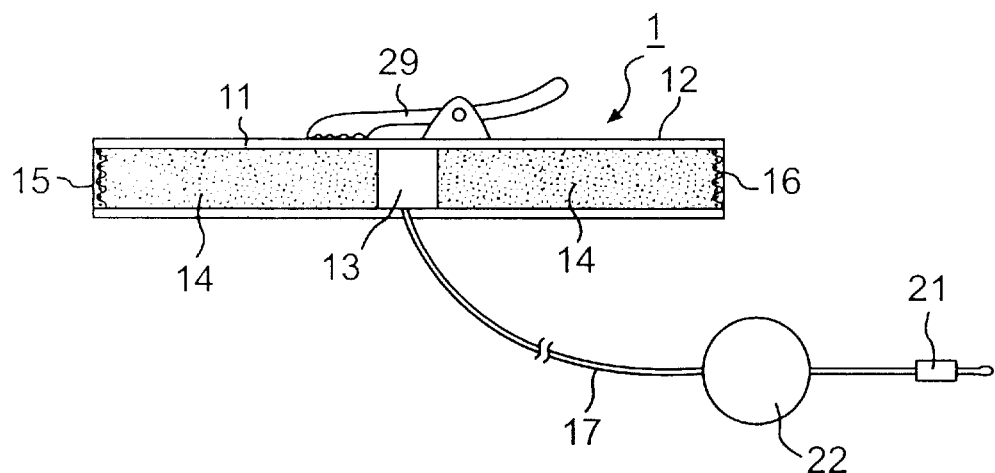
FIG. 22 is a sectional view of a remotely installed transmitter used as a hands-free two-way voice terminal device.
Figure 23:
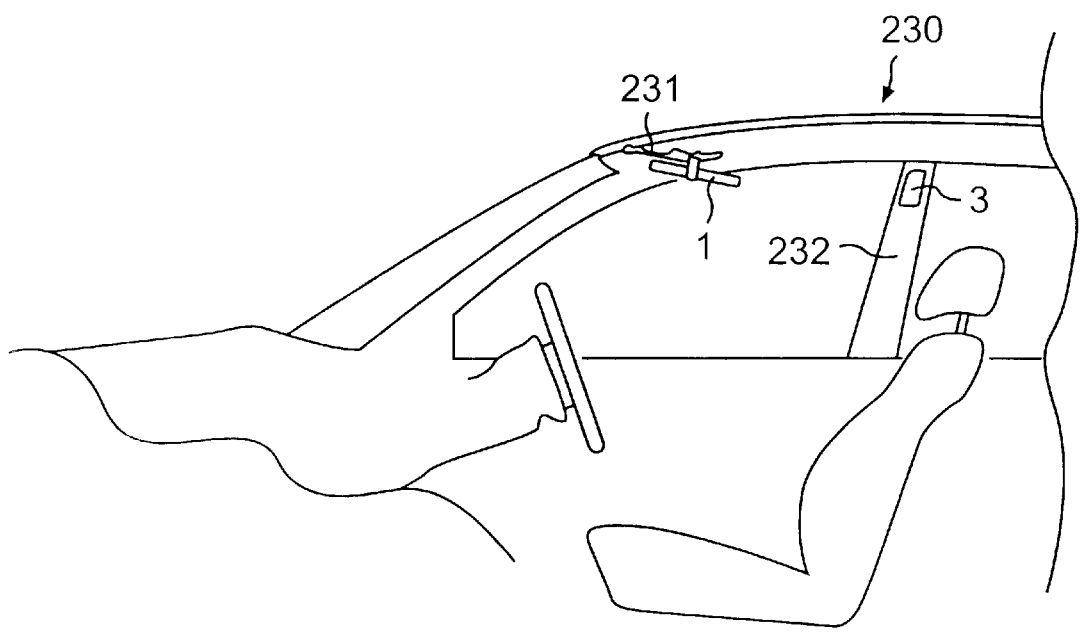
FIG. 23 is a side view illustrating remote installation of the transmitter and receiver of FIG. 22.

FIGS. 22 and 23 illustrate a first example of when transmitter 1 of the present invention is mounted in a vehicle. As shown in FIG. 22, pipes 11 and 12 of transmitter 1 are provided on their outer peripheral surface with a fastening fitting 29, which attaches transmitter 1 to a sun visor or the like. As shown in FIG. 23, the transmitter 1 is attached by the fastening fitting 29 to the sun visor 231 of the driver's seat in the vehicle 230, so that the lengthwise direction of the pipe of the transmitter 1 is directed to the mouth of the driver. On the center pillar 232 of vehicle 230 is receiver 3, which is a speaker, mounted so that the sound-emitting port thereof is directed to the driver's ear.

Figure 24:
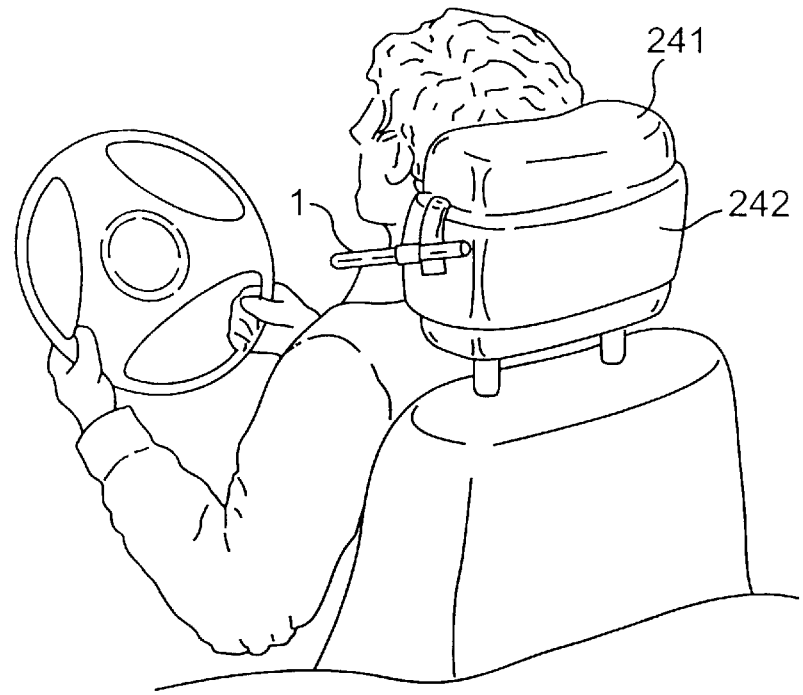
FIG. 24 is a perspective view from the side of the transmitter.
Figure 25:
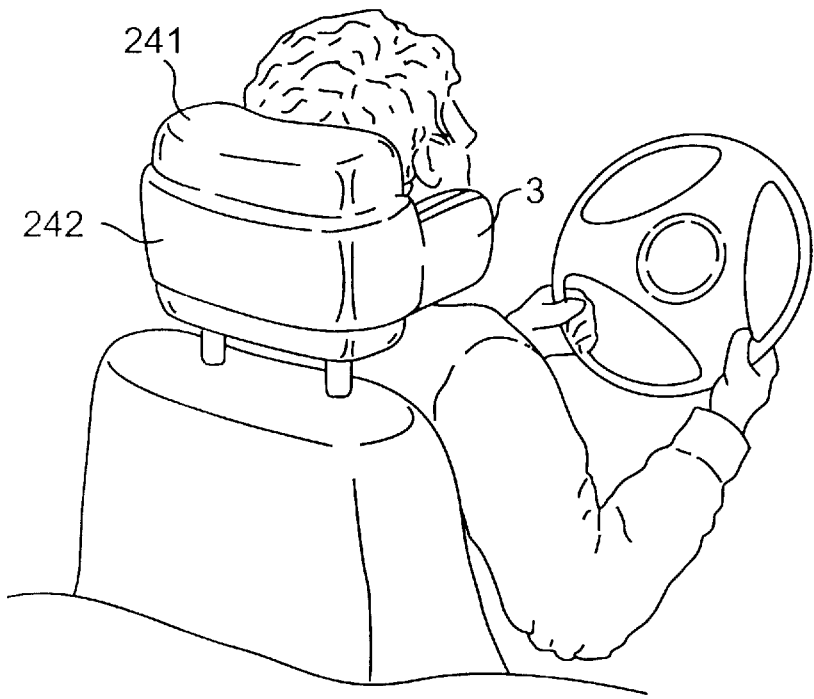
FIG. 25 is a perspective view from the side of the receiver.

FIGS. 24 and 25 illustrate a second example of when transmitter 1 is mounted in a chicle. In the second example as shown in FIG. 24, transmitter 1 is mounted on one side (on the side, which is preferably toward the inside of the vehicle, of a belt-like elastic cloth 242 wound on a headrest 241 of the driver's seat in the vehicle in a manner so that the tip of one pipe is directed to the mouth of the driver. As shown in FIG. 25, furthermore, the receiver 3 is mounted on the other side, for example, the window side, in a manner to extend toward the driver's ear.

The elastic cloth 242 is preferably in the shape of a ring which can be mounted on the headrest 241 from the upper direction, and is detachably attached to the headrest 241. The elastic cloth 242 may be a plain-woven belt and may have a coupling means such as a zipper or other similar attachment device so that the belt can be tightened at the ends thereof. Additionally, receiver 3 and transmitter may be incorporated within the headrest 241.

Described below is the operation of the case when a person talks using the portable telephone in the above-mentioned examples of FIGS. 22 to 25.

The received voice signals are emitted from the receiver 3 to the driver's ear. Since the receiver 3 is disposed near the driver's ear, received voice signals are clearly transmitted from the receiver 3 to the driver even in a noisy environment.

The driver's voice is input to the transmitter 1 from both ends thereof, and an output proportional to a difference between the two input voice levels is taken out from the bidirectional microphone 13. In this case, the ambient noise such as engine noise, wind noise from outside the vehicle, friction noise generated between the tires and the road, and the like enters into the transmitter 1. Here, however, the distance is very large between the sources of ambient noise and the bidirectional microphone 13 of transmitter 1. Therefore, the ambient noise is input to the transmitter 1 from both ends of the pipes 11 and 12 at nearly the same level. Accordingly, the ambient noise is offset and attenuates; i.e., the ambient noise is output as signals of very low levels. Hence, the driver's voice is output from the transmitter 1 at a level much higher than that of the ambient noise and is clearly transmitted.

With transmitter 1 mounted in a vehicle, the driver's voice as well as the ambient noise are converted into electric signals and are output. Receiver 3 emits the voice by partly adding the signals of the transmitter 1 to the voice signals from another person. That is, the speaking driver can easily confirm his own voice emitted from the receiver 3. For this purpose, the transmission signals are partly added to the reception signals.

When the driver is not talking but is listening to another person talking in a noisy environment, the ambient noise is added to that person's speech making it difficult to hear. Similarly, the ambient noise on the driver's side is reproduced by the receiver on the listener's side. Accordingly, conversation is hindered.

According to the present invention, therefore, the ambient noise suppressing circuit 5 shown in FIG. 10 is connected to the transmitter 1 to decrease the amplification gain of the output signals of the transmitter 1 when the person is not talking and to prevent the ambient noise from being transmitted on a large level from the transmitter 1. Thus, the ambient noise is suppressed from being emitted from receiver 3, and suppressed ambient noise is transmitted to another person. Accordingly, the signal to noise ratio is improved, the person is allowed to listen to the talk more easily, and occurrence of feedback is prevented.

The figures and accompanying discussion, illustrate and describe presently preferred embodiments and methods of the present invention. Those skilled in the art will understand that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention involve all embodiments falling within the scope of the appended claims.

What is claimed is:

1. A remotely installed transmitter comprising:
   a bidirectional microphone installed at a central position in a pipe having a predetermined length;
   a plurality of sound pick-up ports formed at suitable positions at least at the right and left ends of said pipe;
   a plurality of sound pick-up chambers formed in said pipe, a first on the right side of said microphone and a second on the left side of said microphone;
   sound-absorbing material situated within the plurality of sound pick-up chambers, wherein the shapes and sizes of said sound pick-up chambers are determined so that minimum voice resonance frequencies of said sound pick-up chambers when they are not stuffed with the sound-absorbing material are higher than the used upper-limit frequency of voice of the transmitter, and the amount of the sound-absorbing material is adjusted so that the frequency characteristics of the transmitter acquire monotonous attenuation characteristics in a frequency band higher than said used upper-limit frequency of voice.

2. The remotely installed transmitter according to claim 1, wherein the shapes and sizes of the sound pick-up chambers are determined so that minimum resonance frequencies of the sound pick-up chambers when they are not stuffed with the sound-absorbing material are higher than the used upper-limit frequency of voice of the transmitter, the amount of the sound-absorbing material being adjusted so that the sensitivities at minimum voice resonance frequencies of said sound pick-up chambers after being stuffed with the sound-absorbing material are not higher than twice the sensitivity at 1 KHz.

3. The remotely installed transmitter according to claim 1, wherein the minimum voice resonance frequencies of the sound pick-up chambers when they are not stuffed with the sound-absorbing material are higher than two-thirds the used upper limit frequency of the voice frequency band of the transmitter.

4. The remotely installed transmitter according to claim 1, wherein a length from the tip of said pipe to the central position of the microphone is selected to be not longer than $\frac{1}{4}$, or longer than $\frac{1}{8}$ but not longer than $\frac{1}{4}$, of the wavelength of the used upper-limit frequency of voice of the transmitter.

5. The remotely installed transmitter according to one of claims 1 and 2, wherein an ambient noise suppressing circuit is connected to an output terminal of said microphone, the ambient noise suppressing circuit having amplification characteristics such that the amplification gain thereof increases with an increase in an output level of the microphone.

6. The remotely installed transmitter according to claim 5, wherein said ambient noise suppressing circuit comprises:
- a gain controller for amplifying an output signal of said microphone;
- a band-pass amplifier for passing signals of a particular frequency band only among the signals output from said microphone;
- a peak detector for detecting a peak value of the signals that have passed through said and-pass amplifier; and
- a holding circuit for holding the peak value output by said peak detector for a predetermined period of time to control the amplification gain of said gain controller depending upon said peak value that is held.

7. A hands-free two-way voice terminal device having a transmitter and a receiver, the transmitter being the remotely installed transmitter according to any one of claims 1 to 4, wherein said receiver is mounted on a first fixing portion is directed to an ear of a speaker, and said transmitter is mounted on a second fixing portion remote by a predetermined distance from the mouth of the speaker so that a tip of the pipe is directed toward the speaker.

8. The hands-free two-way voice terminal device according to claim 7, wherein said receiver and said transmitter are arranged within a vehicle.

9. The hands-free type two-way voice terminal device according to claim 8, wherein said receiver is mounted on a center pillar and said transmitter is mounted on a sun visor.

10. The hands-free type two-way voice terminal device according to claim 8, wherein said receiver is mounted on a first side surface of a headrest of a seat and said transmitter is mounted on a second side surface of the headrest.

11. The hands-free type two-way voice terminal device according to claim 8, wherein said receiver and said transmitter are mounted on a belt member detachably attached to a headrest of a seat, said receiver and said transmitter being located on opposite sides of the headrest.

12. The hands-free two-way voice terminal device according to claim 7, wherein said receiver and said transmitter are arranged within a portable computer.

* * * * *